US008444062B2

(12) United States Patent
Anderton et al.

(10) Patent No.: US 8,444,062 B2
(45) Date of Patent: May 21, 2013

(54) MOBILE FLUID DISTRIBUTION SYSTEM AND METHOD

(75) Inventors: Peter W. Anderton, Peoria, IL (US); Gary A. Ellertson, Pleasant Prairie, WI (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/643,833

(22) Filed: Dec. 21, 2009

(65) Prior Publication Data

US 2010/0301134 A1 Dec. 2, 2010

Related U.S. Application Data

(63) Continuation-in-part of application No. 12/472,415, filed on May 27, 2009.

(51) Int. Cl.

| | |
|---|---|
| ***B05B 1/20*** | (2006.01) |
| ***B05B 1/26*** | (2006.01) |
| ***B05B 9/06*** | (2006.01) |
| ***B05B 17/04*** | (2006.01) |
| ***A01G 25/09*** | (2006.01) |

(52) U.S. Cl. ........ 239/156; 239/155; 239/162; 239/172; 239/176; 239/524

(58) Field of Classification Search .................... 239/11, 239/67, 146, 147, 155, 156, 157, 161, 162, 239/163, 164, 169, 172, 175, 176, 518, 521, 239/523, 524, 570, 571, 586, DIG. 1
See application file for complete search history.

(56) References Cited

U.S. PATENT DOCUMENTS

| | | | | |
|---|---|---|---|---|
| 622,547 | A | 4/1899 | Shedlock et al. | |
| 2,031,262 | A | 2/1936 | Hill, Jr. | |
| 3,100,083 | A | 8/1963 | Wardrup | |
| 3,344,993 | A | 10/1967 | Walder et al. | |
| 3,529,772 | A * | 9/1970 | Brodersen | 239/157 |
| 3,552,658 | A * | 1/1971 | Sons | 239/456 |
| 3,782,634 | A * | 1/1974 | Herman | 239/156 |
| 3,853,272 | A | 12/1974 | Decker et al. | |
| 4,052,003 | A | 10/1977 | Steffen | |
| 4,167,247 | A * | 9/1979 | Sons et al. | 239/455 |
| 4,519,542 | A | 5/1985 | Johnston | |
| 4,676,435 | A * | 6/1987 | Nesland | 239/112 |
| 4,685,545 | A | 8/1987 | Fannin et al. | |
| 4,803,626 | A | 2/1989 | Bachman et al. | |
| 4,817,870 | A | 4/1989 | Dalton | |

(Continued)

FOREIGN PATENT DOCUMENTS

| | | |
|---|---|---|
| EP | 0 294 952 | 5/1988 |

OTHER PUBLICATIONS

"Enviro-Spray Dust Suppression", document downloaded from the Hayden website at <http://www.hydeneng.com.au/SiteFiles/hydenegcomau/02900192A.pdf>before May 27, 2009, 12 pages.

(Continued)

*Primary Examiner* — Ryan Reis
(74) *Attorney, Agent, or Firm* — Miller, Matthias & Hull

(57) ABSTRACT

A fluid distribution system and method for mobile applications. The system includes a power source, a pump driven by the power source, and a motor driven by the pump. The system also includes a spray head with a fluid inlet passage, a fluid outlet passage, a fluid piston disposed in a chamber for controlled access between the inlet and outlet passages and defining a variable orifice, and a hydraulic cylinder controllably engaged to the orifice. The fluid piston and the hydraulic cylinder are aligned with a common longitudinal axis, and the inlet passage is offset from the axis in a direction opposed to the location of the outlet passage.

19 Claims, 11 Drawing Sheets

U.S. PATENT DOCUMENTS

| | | | |
|---|---|---|---|
| 5,076,497 | A | 12/1991 | Rabitsch |
| 5,134,961 | A | 8/1992 | Giles et al. |
| 5,522,543 | A | 6/1996 | Herzog |
| 5,618,022 | A | 4/1997 | Wallace |
| 5,911,362 | A | 6/1999 | Wood et al. |
| 5,911,363 | A * | 6/1999 | Oligschlaeger ................. 239/11 |
| 5,964,410 | A | 10/1999 | Brown et al. |
| 5,988,535 | A | 11/1999 | Kime |
| 6,068,200 | A | 5/2000 | Kime |
| 6,119,955 | A * | 9/2000 | Starr ............................... 239/11 |
| 6,382,523 | B1 * | 5/2002 | Hedegard ...................... 239/172 |
| 6,446,879 | B1 | 9/2002 | Kime |
| 6,454,183 | B1 | 9/2002 | Hedegaard et al. |
| 6,938,829 | B2 | 9/2005 | Doherty et al. |
| 7,108,196 | B2 | 9/2006 | Kime |
| 7,182,278 | B2 | 2/2007 | Haviland et al. |
| 7,370,818 | B2 | 5/2008 | Ward |
| 2006/0273189 | A1 | 12/2006 | Grimm et al. |

OTHER PUBLICATIONS

“Thiess Smart Water Trucks”, document downloaded from the Thiess website at <http://www.qrc.org.au/conference/_dbase-upl/Innov/SmartWaterTrucks_Thiess.pdf>before May 27, 2007, 7 pages.

“Smart Hydraulics boost truck spray time”, document downloaded from the Machine Design website at <http:// machinedesign.texterity.com/machinedesign/20090205/?pg=28>before May 27, 2009, 1 page.

“Water Distribution System”, document downloaded from the Open Loop website at <http://openloop.net/water%20dist1.html>Apr. 8, 2009, 1 page.

* cited by examiner

MOBILE FLUID DISTRIBUTION SYSTEM AND METHOD

This application is a continuation-in-part of U.S. patent application Ser. No. 12/472,415, entitled "MOBILE FLUID DISTRIBUTION SYSTEM AND METHOD", filed May 27, 2009.

TECHNICAL FIELD

This disclosure relates generally to a system and method for fluid distribution and, more particularly, to a system and method for controlled distribution of a fluid in a mobile environment.

BACKGROUND

Fluid distribution systems, in particular mobile fluid distribution systems, are used in a variety of applications. For example, at mining and construction sites, it is common to use mobile fluid distribution systems to spray water over routes and work areas to minimize the creation of dust during operations. A specific example might include a water truck that sprays water over roads at a mine site.

Other applications of mobile fluid distribution systems may include spraying of pesticides and herbicides, e.g., for agricultural use, disbursement of saline solutions on roads for snow and ice control, fire suppression, and the like.

For various reasons, such as cost and consistent fluid application, it is desired to maintain control of the amount and pattern of fluids being distributed, in particular with regard to maintaining a uniform and consistent application of fluid per unit of area. For example, when spraying water on mine roads, it may be desired to uniformly distribute the water over the road surface to avoid applying excess water in specific locations.

Typical fluid distribution systems spray fluids at flows that are directly proportional to engine speeds of the mobile machines. Operators attempt to keep the fluid flow relatively constant by maintaining constant engine speeds, at least to the extent possible. These efforts typically require operating mobile machines at reduced transmission gear ratios to maintain desired engine speeds. However, these efforts cannot be maintained, for example, when ascending or descending steep inclines, conditions which generally require changing engine speeds. The spray head's spray pattern changes as the flow changes, making it difficult for an operator to distribute the desired fluid per unit of area without causing spray overlap, often significant in nature, from multiple spray heads that causes poor traction conditions.

Efforts have been made to maintain fluid flow in proportion to machine speed, i.e., ground speed, rather than engine speed. Although this has resulted in improved fluid distribution per unit area, it is still difficult to maintain precise control during various operating maneuvers, such as starting and stopping, and as operating conditions vary. Furthermore, many of these systems still distribute fluids in proportion to fluid flow, which adds to the difficulty of consistent application per unit of area.

One example of an attempt to achieve uniform fluid application is described in U.S. Pat. No. 5,964,410 to Brown et al. (the Brown patent). Brown employs spray heads with variable orifices to attempt maintenance of constant velocities and exit flow trajectories. The spray heads are pressure controlled, however, relying on pressure of the fluid being sprayed to overcome a spring force to open the spray nozzle. Furthermore, the components that are used to control the nozzle are located in the main fluid flow chamber, and thus are susceptible to corrosion and contamination by particles and debris in the fluid. As a result, the system would still have difficulty achieving consistent application of the fluid per unit of area during various operating conditions.

The present disclosure is directed to overcoming one or more of the problems as set forth above.

SUMMARY

In one aspect of the present disclosure a fluid distribution system is disclosed. The system includes a power source, a pump driven by the power source, and a motor driven by the pump. The system also includes a spray head with a fluid inlet passage, a fluid outlet passage, a fluid piston disposed in a chamber for controlled access between the inlet and outlet passages and defining a variable orifice, and a hydraulic cylinder controllably engaged to the orifice. The fluid piston and the hydraulic cylinder are aligned with a common longitudinal axis, and the inlet passage is offset from the axis in a direction opposed to the location of the outlet passage.

In another aspect of the present disclosure a method for distributing a fluid is disclosed. The method includes determining a ground speed of a mobile machine, determining a flow of fluid being delivered to a spray head having a variable orifice, comparing the determined flow to a desired fluid flow, controlling a motor to maintain the desired fluid flow, and controlling the variable orifice as a function of the ground speed and independent of fluid flow to maintain a desired spray pattern to provide a consistent and uniform distribution of fluid.

In yet another aspect of the present disclosure a spray head for a fluid distribution system is disclosed. The spray head includes a fluid inlet passage, a fluid outlet passage, a fluid piston disposed in a chamber for controlled access between the inlet and outlet passages and defining a variable orifice, and a hydraulic cylinder controllably engaged to the orifice. The fluid piston and the hydraulic cylinder are aligned with a common longitudinal axis, and the inlet passage is offset from the axis in a direction opposed to the location of the outlet passage.

DETAILED DESCRIPTION

Figure 1:
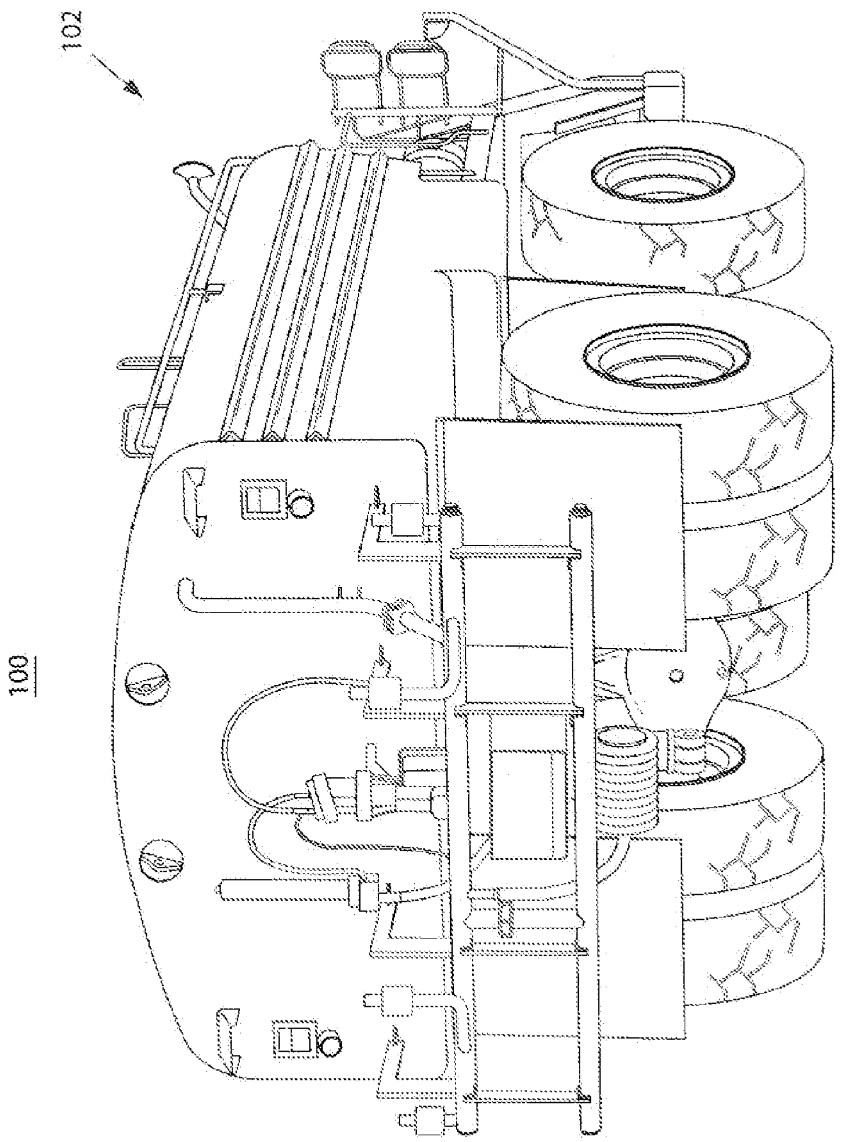
FIG. 1 is a diagrammatic illustration of a mobile machine suited for use with the present disclosure.

Referring to the drawings, a mobile fluid distribution system 100 and method for distributing fluids is shown.

Referring to FIG. 1 in particular, a mobile machine 102 suited for use for distributing fluids is depicted. The mobile machine 102 of FIG. 1 is shown as a truck, i.e., typical for use in off-highway applications, converted for use to distribute fluids. However, other types of mobile machines may be employed, for example, articulated trucks, on-highway trucks, tractor-scrapers, tractors in combination with trailers, and the like.

Although not labeled as such in FIG. 1, the mobile machine 102 is fitted with a fluid tank (element 430 in FIG. 4), and is shown with a variety of piping, hoses, pumps and valves for fluid distribution purposes. In particular, the mobile machine 102 in FIG. 1 is shown as an off-highway truck configured as a water truck for spraying water at a work site that typically generates much dust during work operations. The present disclosure, however, may also apply to other types of mobile machines set up to distribute water or other types of fluids in a wide variety of applications. For example, a tractor pulling a trailer may be used to distribute chemicals in agricultural settings, an on-highway truck may be configured to spray a saline solution on roads, runways, or parking lots to melt snow and ice, and other varieties of applications and setups may be used.

Figure 2A:
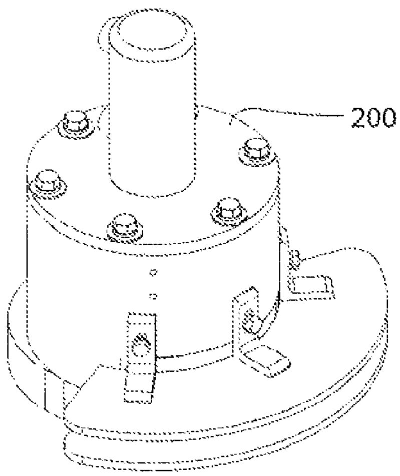
FIGS. 2A and 2B are diagrammatic views of a spray head suited for use with the present disclosure.
Figure 2B:
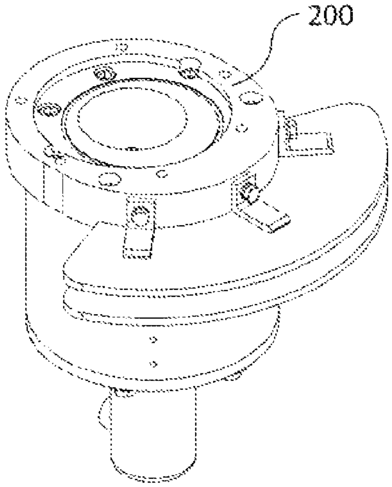

FIGS. 2A and 2B illustrate views of a spray head 200 that may be used with the present disclosure. As shown more clearly and in more detail in FIG. 3, the spray head 200 may be assembled in relation to a longitudinal axis 312 for reference purposes. For example, the spray head 200 includes a fluid inlet passage 302 and a fluid outlet passage 304. The outlet passage 304 may be located at a position offset from the longitudinal axis 312. The inlet passage 302 may be located at a position offset from the longitudinal axis 312 and in a direction opposed to the location of the outlet passage 304. The location of the inlet passage 302 relative to the location of the outlet passage 304, i.e., on opposite sides of the longitudinal axis 312, may contribute to providing a laminar flow of fluid from the spray head 200. Such laminar flow may result in a flat spray pattern having droplets of a minimal size large enough to achieve reduced atomization of the fluid. In a water truck example, this may contribute to optimal fluid control from the spray head 200 to a desired surface during mobile spraying.

Figure 3:
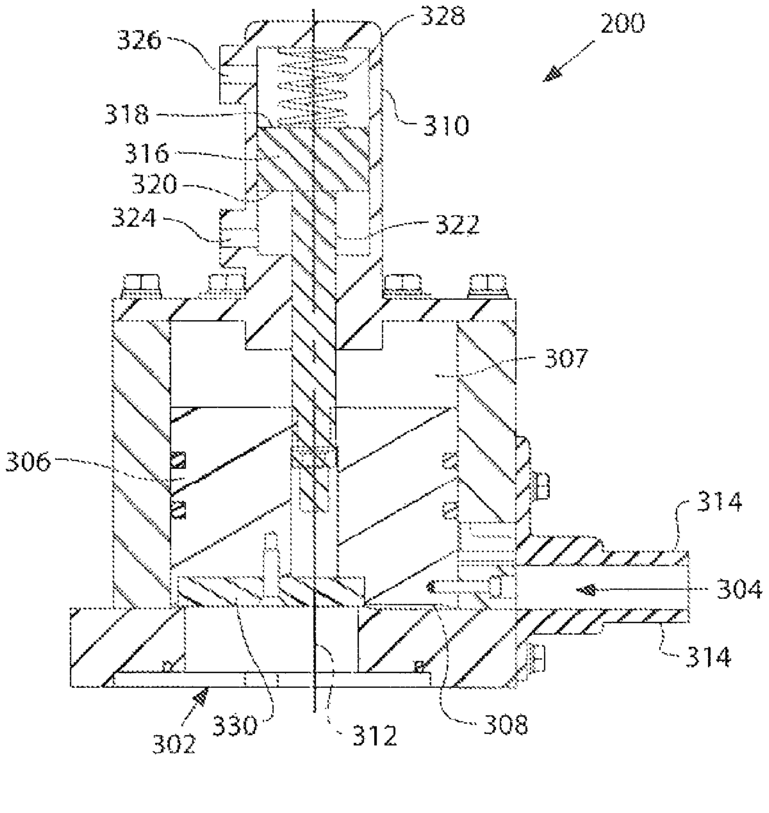
FIG. 3 is a cut-away view of the spray head of FIGS. 2A and 2B.

A fluid piston 306 disposed in a chamber 307 of the spray head 200 defines a variable orifice 308 and may provide controlled access between the inlet passage 302 and the outlet passage 304. Movement of the fluid piston may be controlled via any suitable means known in the art, such as, e.g., with a single or double acting hydraulic cylinder or an electric motor ballscrew. Specifically, as shown in FIG. 3, a hydraulic cylinder 310 is controllably engaged to the orifice 308. The hydraulic cylinder 310 includes a hydraulic piston 316 connected to a rod 322, which in turn is connected to the fluid piston 306. In operation, as the hydraulic piston 316 is controlled to move, i.e., linear with the longitudinal axis 312, the rod 322 moves and the fluid piston 306 subsequently moves, which results in a change in size of the orifice 308.

In the embodiment shown in FIG. 3, the hydraulic cylinder 310 is a double acting hydraulic cylinder 310. That is, the hydraulic cylinder 310 is hydraulically controlled to move in either direction. In more detail, the hydraulic piston 316 includes a head end 318 and a rod end 320. The hydraulic cylinder 310 includes a first hydraulic port 324 positioned to allow hydraulic fluid in the hydraulic cylinder 310 at the rod end 320, and a second hydraulic port 326 positioned to allow hydraulic fluid in the hydraulic cylinder 310 at the head end 318. Detailed operation of hydraulic circuits that may be used to control the spray heads 200 is described below.

The hydraulic cylinder 310 may include a spring 328 disposed in the head end 318. The spring 328 may provide additional force to hold the orifice 308 in a closed position, for example when the hydraulic circuits are shut down. The spring 328 may also be used to supplement the force applied to the head end 318 of the hydraulic cylinder 310. For example, the spring 328 may be selected having a desired compression rate (e.g., force per unit of compression). The total forces applied to the head end 318 may be from a combination of hydraulic fluid supplied to the second hydraulic port 326 and the force of the spring 328, and the total forces applied to the rod end 320 may be from a combination of hydraulic fluid supplied to the first hydraulic port 324 and pressure from fluid entering the inlet passage 302. If the fluid pressure entering the inlet passage 302 is kept fairly constant, then control of the degree of opening of the orifice 308 may be attained by varying the hydraulic fluid to the first hydraulic port 324.

It is noted that the spray head 200 may be configured for control of the fluid piston 306 by use of other configurations. For example, the hydraulic cylinder 310 may be configured without the second hydraulic port 326 and the associated hydraulic components, thus relying on hydraulic pressure on the rod end 320 and spring pressure on the head end 318.

It is further noted that the spray head 200 may be configured for control by other than a hydraulic piston 316. For example, the hydraulic cylinder 310, hydraulic piston, 316, and all associated hydraulic circuits and components could be replaced by electrical or mechanical actuators. As specific examples, the fluid piston 306 may be controlled by an electrical actuator such as a solenoid (not shown), or may be controlled by a mechanical actuator which may include any of a variety of cams, screws, levers, fulcrums, and the like (also not shown).

The hydraulic cylinder 310 may be fluidically isolated from the chamber 307, thus isolating the fluid that passes through the orifice 308 from the hydraulic fluid in the hydraulic cylinder 310. This design offers the advantage of keeping particles and contaminants away from the components in the hydraulic cylinder 310, for example when water from retaining ponds is used for dust suppression applications.

The spray head 200 may include one or more fluid deflectors 314 connected to the spray head 200 and configured to control a fluid distribution pattern from the outlet passage 304. For example, two fluid deflectors 314 are shown in FIG. 3 (and may be viewed in FIGS. 2A and 2B, although not labeled as such). The fluid deflectors 314 may be configured to control the fluid distribution pattern, for example in a laminar flow, from the outlet passage 304 in furtherance of the laminar flow control that may be provided by the above-described specific locations of the inlet and outlet passages 302,304 relative to the longitudinal axis 312.

A seal plate 330, attached to the fluid piston 306, may be used to further deflect fluid to attain a desired spray pattern, for example by designing the seal plate 330 with a desired shape and physical configuration.

Figure 4:
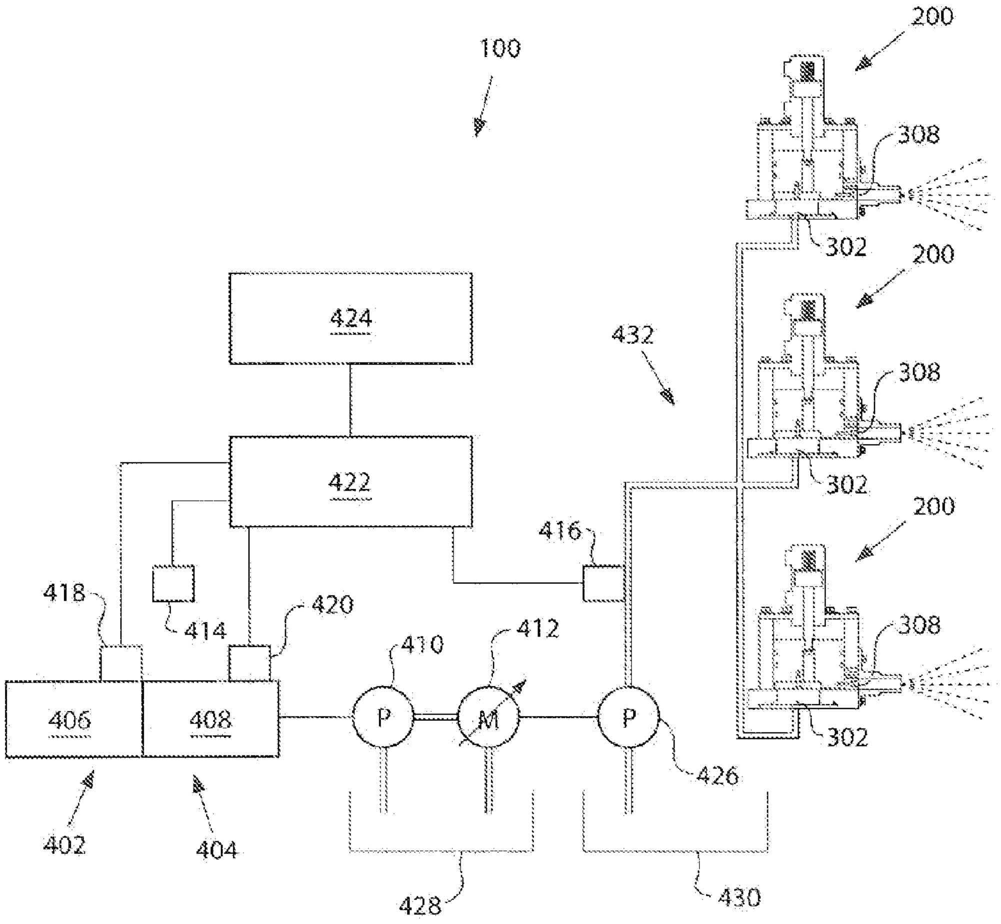
FIG. 4 is a representative block diagram of a fluid distribution system.

Referring to FIG. 4, a block diagram of a representative portion of a fluid distribution system 100 is shown. For exemplary purposes, FIG. 4 is described as applied to a mobile machine 102, i.e., an off-highway truck, set up for use as a water truck at a mining or construction site, although the fluid distribution system 100 shown in FIG. 4 could be used in other applications as noted above.

A power source 402 to supply power for the fluid distribution system 100 may also be used to supply motive power for the mobile machine 102. For example, the power source 402 may include a prime mover 404 for the mobile machine 102. The prime mover 404 may include an engine 406 drivingly connected to the mobile machine 102 and a transmission 408 driven by the engine 406. The engine 406 and transmission 408 may be chosen from among many types and configurations that are well known in the art. It is also well known to use the power supplied by prime movers 404 for other purposes in addition to providing motive power. For example, an off-highway truck, prior to being configured for water distribution applications, may have been designed to use power from the prime mover 404 for applications such as raising and lowering a truck bed.

A pump 410, driven by the power source 402, is in turn configured to drive a motor 412. The pump 410 may be driven by the engine 406 or the transmission 408 by means that are known in the art, and may be a hydraulic pump 410 as is also known in the art. The pump 410 may be configured to drive the motor 412 by well known hydraulic means. A hydraulic tank 428 may be used to supply and recover hydraulic fluid to and from the pump 410 and motor 412.

In the embodiment shown in FIG. 4, the pump 410 may be a fixed displacement type and the motor 412 may be variable displacement. For example, an off-highway truck configured for use as a water truck may have an existing fixed displacement pump 410 already in place for other purposes. Adding a variable displacement motor 412 may offer advantages in control of the fluid distribution system 100, for example by enabling control of fluid pressure to maintain the fluid at a constant desired pressure regardless of engine speed or ground speed. A fixed displacement pump 410 may still be used for applications other than fluid distribution without being affected by changes in fluid distribution parameters. For example, the pump 410 may drive the motor 412 and also drive a system for cooling brake components (not shown). The brake cooling system would not be affected by load changes from the fluid distribution system 100. In alternative embodiments, the pump 410 and motor 412 may be other combinations of fixed and variable displacement devices, for example a variable displacement pump and a fixed displacement motor.

The motor 412 is fluidly connected to one or more spray heads 200, e.g., three spray heads as shown in FIG. 4. More specifically, the motor 412 may provide hydraulic power to a fluid pump 426, which in turn delivers fluid by way of fluid lines 432 to the inlet passages 302 and through the orifices 308 of the spray heads 200. The fluid pump may obtain fluid from a fluid tank 430, for example a water tank mounted on a water truck.

Although the three spray heads 200 in FIG. 4 are shown connected by common fluid lines 432 to the fluid pump 426, each spray head 200 may be independently controllable. In addition, each spray head 200 may include an orifice 308 that is continuously variable from a fully closed position to a fully open position, as distinguished from an orifice that is capable of only being open or closed.

A ground speed sensor 414, located on the mobile machine 102, may be configured to sense a ground speed as the machine moves. The ground speed sensor 414 may be located to sense ground speed based on operation of the transmission 408, rotational movement of a ground engaging member (not shown) such as a wheel, or by some other method known in the art.

A fluid pressure sensor 416 may be located to sense pressure of fluid in fluid lines 432, or alternatively fluid pressure exiting fluid pump 426.

An engine speed sensor 418 may be located to sense the speed of the engine 406.

A transmission state sensor 420 may be located to sense the state, e.g., forward, neutral, or reverse, of the transmission 408. The transmission state sensor 420 may alternatively sense direction of motion of the mobile machine 102 to determine transmission state.

Any of the above sensors may be configured to directly sense a desired parameter, may sense one or more secondary parameters and derive a value for the desired parameter, or may determine a value for the desired parameter by some other indirect means. Operation of the above sensors for their intended purposes are well known in the art and will not be described further.

A controller 422 may receive sensed or derived signals from the ground speed sensor 414, the fluid pressure sensor 416, the engine speed sensor 418, and the transmission state sensor 420. The controller 422 may also be controllably connected to one or more of the motor 412 and the spray heads 200. For example, and as described in more detail below, the controller 422 may use information received from the ground speed sensor 414 and the fluid pressure sensor 416 to determine a desired fluid pressure to maintain, and responsively control the variable displacement of the motor 412 to maintain a constant fluid pressure. The controller 422 may also use information received from the engine speed sensor 418 for further control of the variable displacement motor 412. The controller 422 may also use the above received information to control the variable orifices 308 of the spray heads 200 to control a flow rate of the fluid being delivered to and sprayed from the spray heads 200. In one specific example, the controller 422 may determine from the transmission state sensor 420 if the mobile machine 102 is moving in reverse, and responsively shut off the fluid distribution system 100 during this condition.

An operator control device 424, located in a cab compartment (not shown) of the mobile machine 102, may provide an operator with a variety of control and display functions for the fluid distribution system 100. The operator control 424 may be of any desired configuration and may be custom designed for specific mobile machines and applications.

Figure 8:
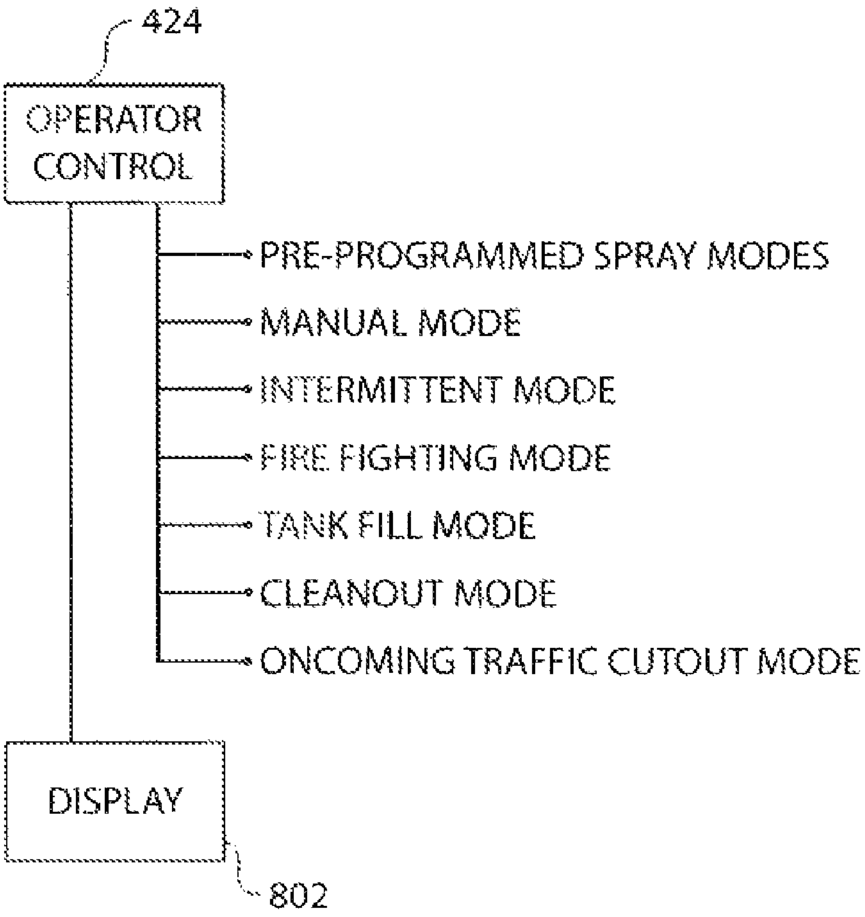
FIG. 8 is a diagrammatic representation of an operator control suited for use with the present disclosure.

Referring to FIG. 8, the operator control 424 may include a display 802. The display 802 may be used to provide visual indication of a wide variety of information including, but not limited to, a current operating mode of the fluid distribution system 100, various sensed and determined parameters (such as engine and ground speeds, fluid pressures, and the like) fluid levels in the fluid tank 430, and any other information desired to be provided. The display 802 may include visual display of information and may also include audible alerts such as low levels of fluid in the fluid tank 430, and the like.

Various operating modes may be selected from the operator control 424 through the use of a wide variety of operator input devices (not shown) which may include, but are not limited to, switches, dials, levers, joysticks, buttons, and the like. FIG. 8 lists a sampling of available modes in no particular order. The list is not meant to be all-inclusive and additional modes may be made available as desired.

Pre-programmed spray modes may allow an operator to select from among a variety of spray modes based on the intended application. It may also be a feature that additional modes may be programmed for later use.

Manual mode may allow an operator to set up desired parameters, for example selecting a desired pressure, flow rate, number of active spray heads, spray pattern, and the like.

Intermittent mode may allow an operator to select a pulsing spray pattern that may be adjusted as a function of time or spray distance.

Fire fighting mode may allow the fluid to be diverted to a spray cannon (not shown), hose reel (not shown), and/or to any combination of spray heads 200.

Tank fill mode may enable pumps and valves needed to pump fluid into the fluid tank 430. Tank fill mode may be set up to be automatic, semi-automatic, or manual. Alternatively to pumping fluid into the fluid tank 430, tank fill mode may provide for filling of the fluid tank 430 by gravity or external pumping means.

Cleanout mode may be used to open each orifice 308 to a maximum open position to flush debris from the spray heads 200. This feature may be particularly useful, for example, when a water truck obtains water from a pond or stream, thus introducing sediment, debris and particles into the fluid tank 430.

Oncoming traffic cutout mode may be used to quickly and easily shut off specific spray heads 200 that otherwise would undesirably direct spray onto objects, such as other vehicles passing the mobile machine 102. This feature may be needed for a short duration only, and thus may be controlled by use of a momentary contact switch or trigger.

Figure 5A:
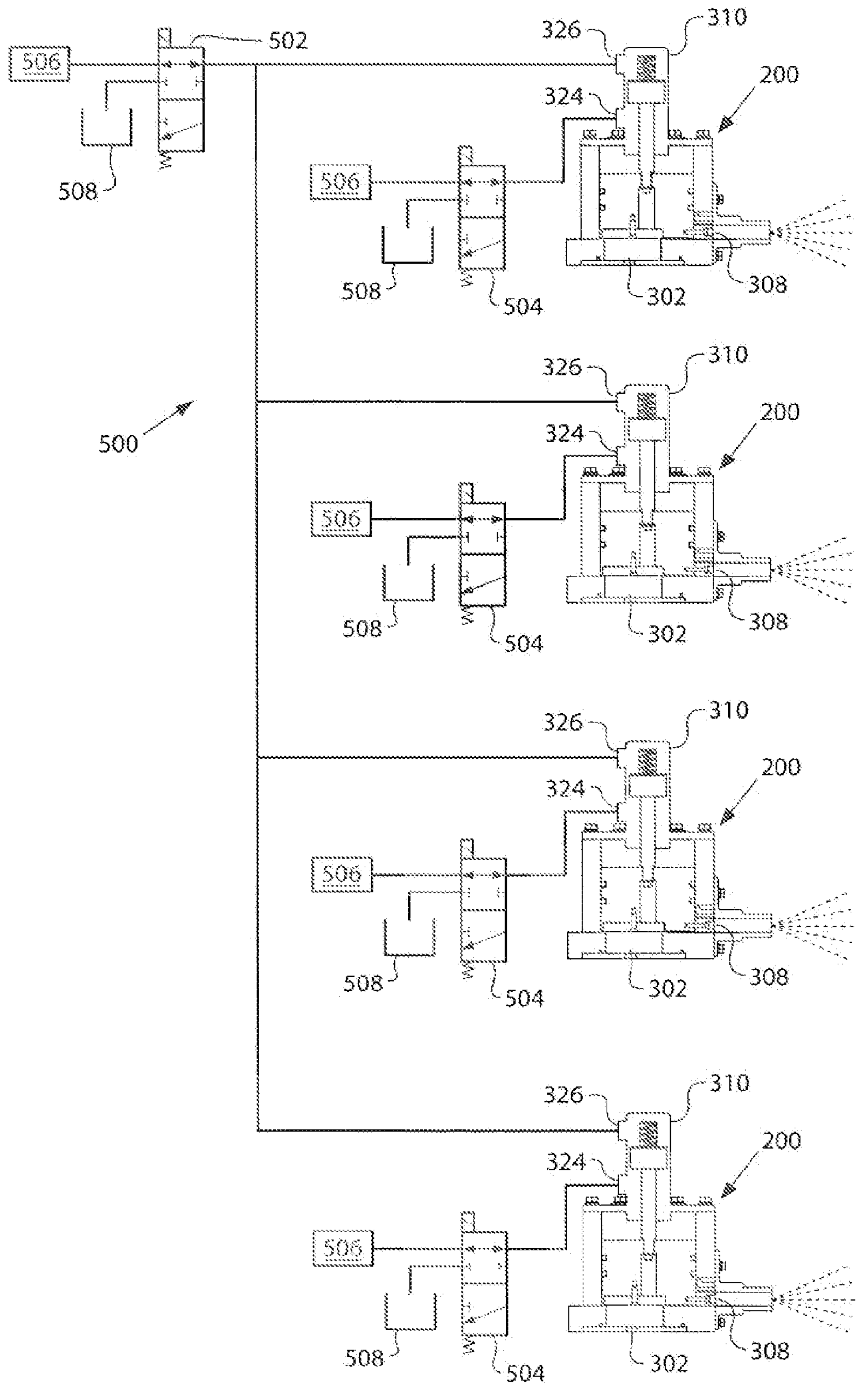
FIGS. 5A and 5B are representative diagrams of a hydraulic system suited for use with the fluid distribution system of FIG. 4.
Figure 5B:
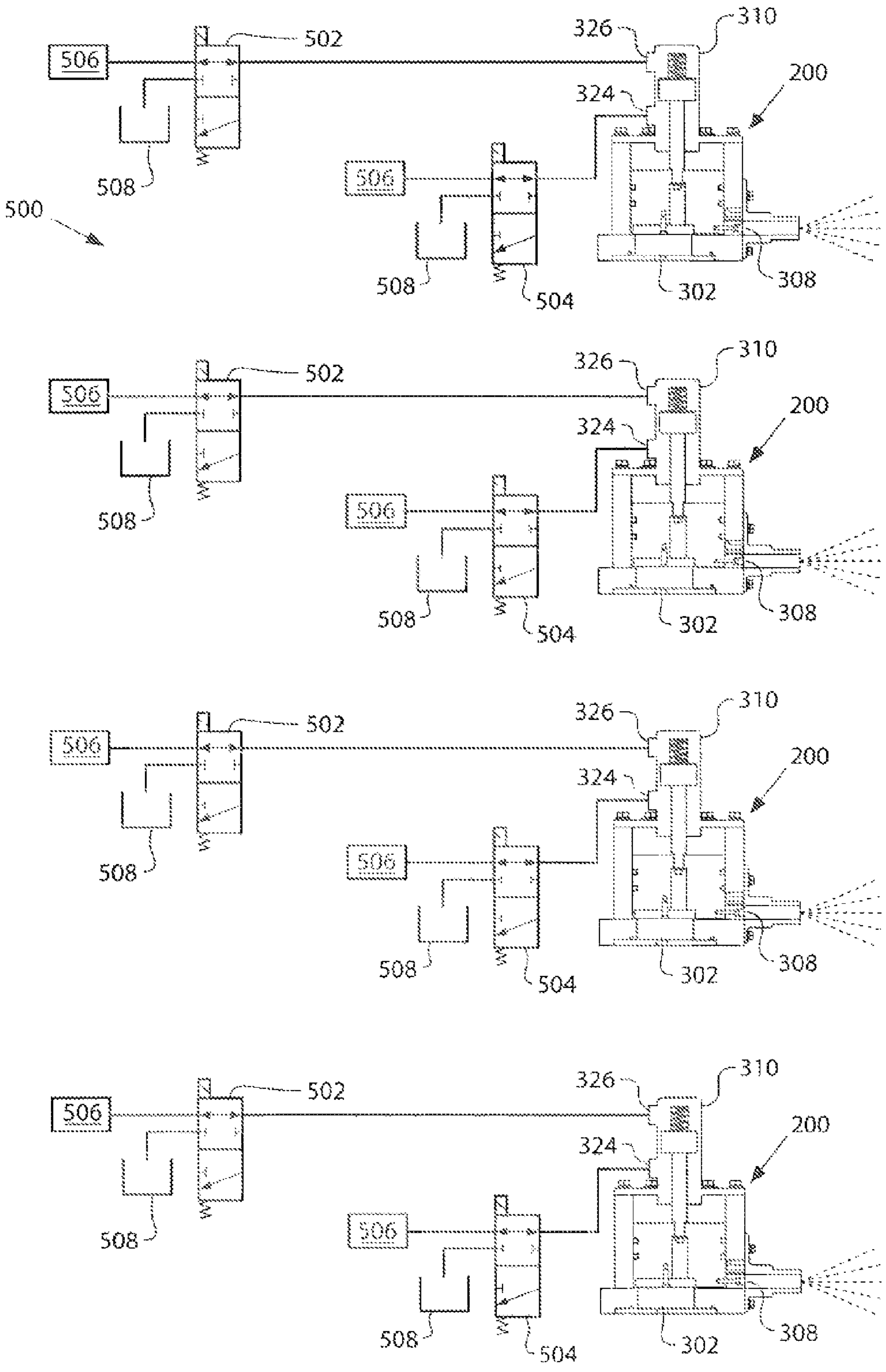

Referring to FIGS. 5A and 5B, various embodiments of a hydraulic system 500 suited to control a portion of the fluid distribution system 100 is shown. The hydraulic system 500 is representative only and is not meant to be limiting in scope and application. For illustrative purposes only, four spray heads 200 are shown.

Each hydraulic cylinder 310 may be double acting, i.e., each hydraulic piston 316 is controlled at both a head end 318 and a rod end 320. A head end valve 502, hydraulically connected to the second hydraulic port 326, is controlled to apply pressure to the head end 318, thus driving the orifice 308 toward a closed position. A rod end valve 504, hydraulically connected to the first hydraulic port 324, is controlled to apply pressure to the rod end 320, thus driving the orifice 308 toward an open position.

FIG. 5A depicts one head end valve 502 controlling all spray heads 200 simultaneously, and one rod end valve 504 controlling each spray head 200 individually. In this configuration, the single head end valve 502 applies pressure to all spray heads 200 toward a closed position, and each rod end valve 504 is independently controlled to apply pressure to a corresponding spray head 200 toward an open position. Other configurations may be used, however, without deviating from the scope of the present disclosure. For example, as depicted in FIG. 5B, multiple head end valves 502 may be used to control a corresponding number of spray heads 200 individually.

A hydraulic supply 506 and a hydraulic tank 508 supply hydraulic fluid to and from the head end and rod end valves 502,504. Although the hydraulic supply 506 and hydraulic tank 508 are shown as separate units for each valve (for ease of illustration), it is contemplated that one hydraulic supply 506 provides pressurized hydraulic fluid to all of the valves 502,504, and one hydraulic tank 508 provides a return to tank path for all of the valves 502,504. The hydraulic supply 506 may be a dedicated supply, e.g., a pilot supply, located on the mobile machine 102, or may be part of a larger hydraulic system which may include the pump 410. In like manner, the hydraulic tank 508 may be a separate tank or may be associated with the hydraulic tank 428.

Figure 9:
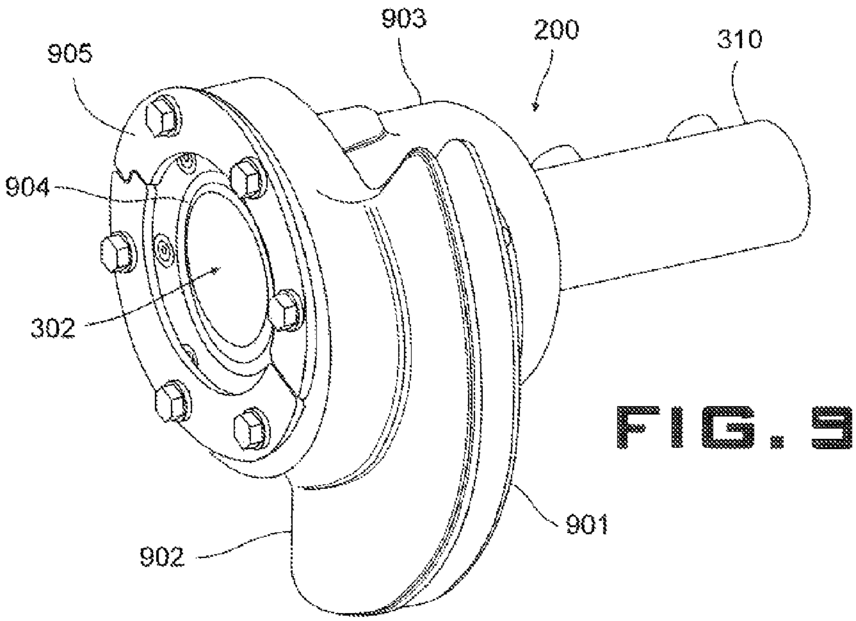
FIGS. 9, 9A and 9B are perspective illustrations of a spray head of the present disclosure.
Figure 9A:
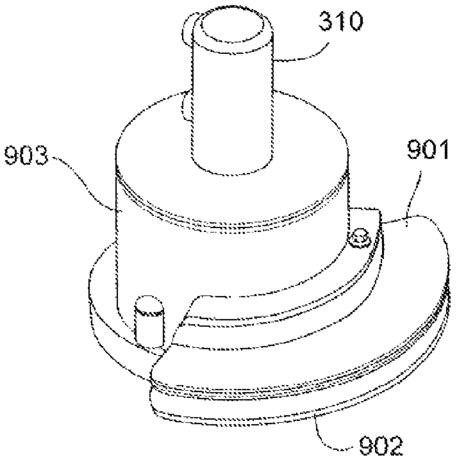
Figure 9B:
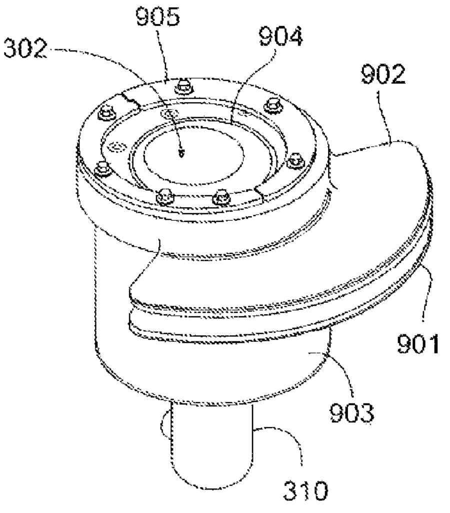

With reference to FIGS. 9A and 9B, another embodiment of the present disclosure is displayed. As seen in these figures, both a first fluid deflector 901 and a second fluid deflector 902 are integrated as cast-in contoured aspects of spray head 200 components as opposed to having right angled tabs that serve as the connection joint, as shown in FIGS. 2A and 2B. As shown, first fluid deflector 901 and second fluid deflector 902 are joined to spray head body 903 at positions likely to minimize the stress on the deflectors 901,902 themselves. FIGS. 9A and 9B further show how o-ring 904 and clamp ring 905, which comprise multiple pieces, are oriented to form a fluid-tight interface between the component delivering fluid to spray head 200 and spray head 200 itself.

Figure 10A:
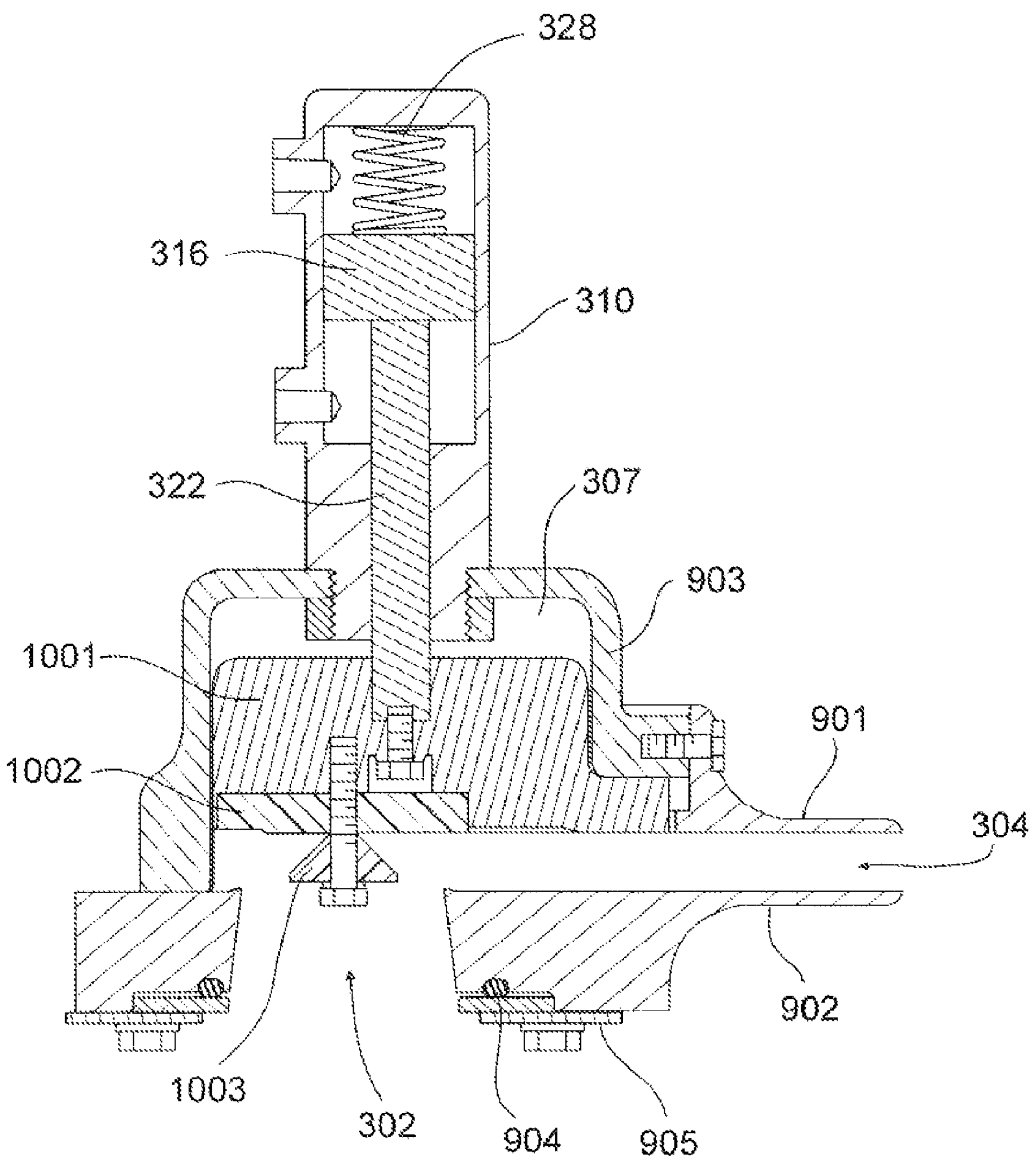
FIGS. 10A and 10B are cross-sectional illustrations of the spray head of FIGS. 9A and 9B.
Figure 10B:
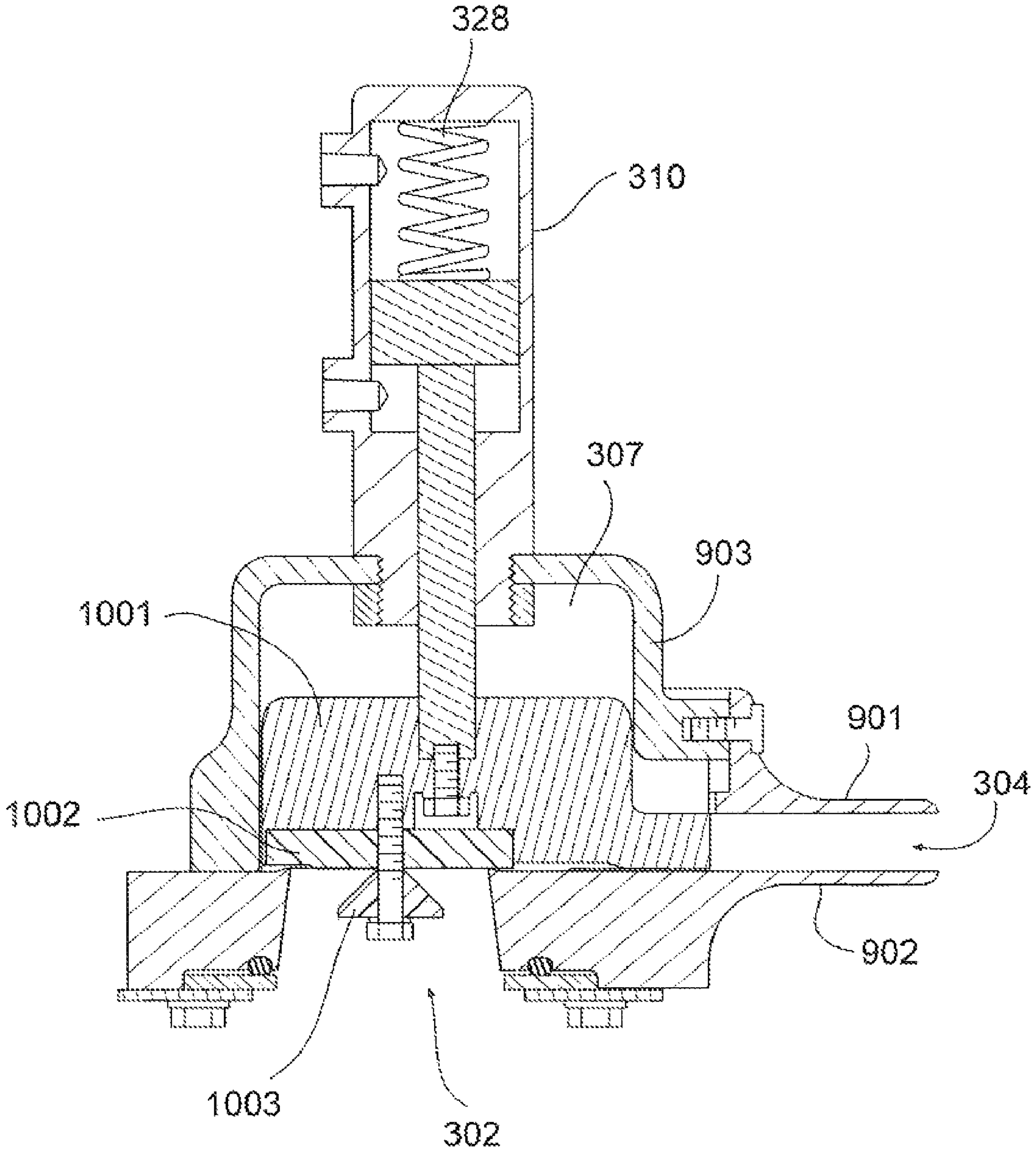

FIGS. 10A and 10B show further distinguishing aspects of this embodiment when compared to FIG. 3. In particular, FIG. 10A shows spray head 200 with piston 1001 in the open position, such that fluid entering spray head 200 at inlet passage 302 is permitted to exit spray head 200 at outlet passage 304, while FIG. 10B shows spray head 200 with piston 1001 in the closed position.

Seal 1002 is joined to piston 1001 and acts to prevent fluid from entering hydraulic cylinder 310 and prevent fluid from entering spray head 200 via inlet passage 302 when piston 1001 is in the closed position, as shown in FIG. 10B. Seal 1002 may be made of any suitable material, such as a polymer, that is able to prevent fluid movement into hydraulic cylinder 310, withstand the wear of fluid engaging the surface of seal 1002 throughout operation of spray head 200, and form a reliable fluid-tight interface between inlet passage 302 and seal 1002.

Internal diverter 1003 may also joined to piston 1001 and seal 1002 using any acceptable joining means, such as, e.g., the screw shown in FIGS. 10A and 10B. Unexpectedly, it was discovered that the presence of internal diverter 1003 may introduce turbulence in the fluid flowing through spray head 200, and that the induced turbulence allows the fluid flow to be more accurately controlled and be more predictable. In existing spray heads without an internal diverter, spray flow has been shown to be heavily concentrated in the middle of the spray width by as much as five times the concentration as the amount distributed at the periphery of the spray width. As indicated, the presence of the internal diverter 1003 reduces the variance in the concentration of the spray across the spray width. Internal diverter 1003 may be made of any suitable material such as, in one example, a polymer. Internal diverter 1003 may be of any suitable shape, such as, e.g., the wedge shape shown in FIGS. 10 and 11. However, it is probable that the beneficial impact of internal diverter 1003 is due at least in part to the amount of area of inlet passage 302 that is obstructed by the presence of internal diverter 1003. That is, it may be beneficial to have the surface area of the internal diverter 1003 surface facing inlet passage 302, shown as 1103 in FIG. 11, be in a ratio to the total area of the orifice of inlet passage 302 of between about 2:3 and about 1:10. For example, this ratio is between about 1:2 and about 1:5, such as between about 1:3 and about 1:4.

Figure 11:
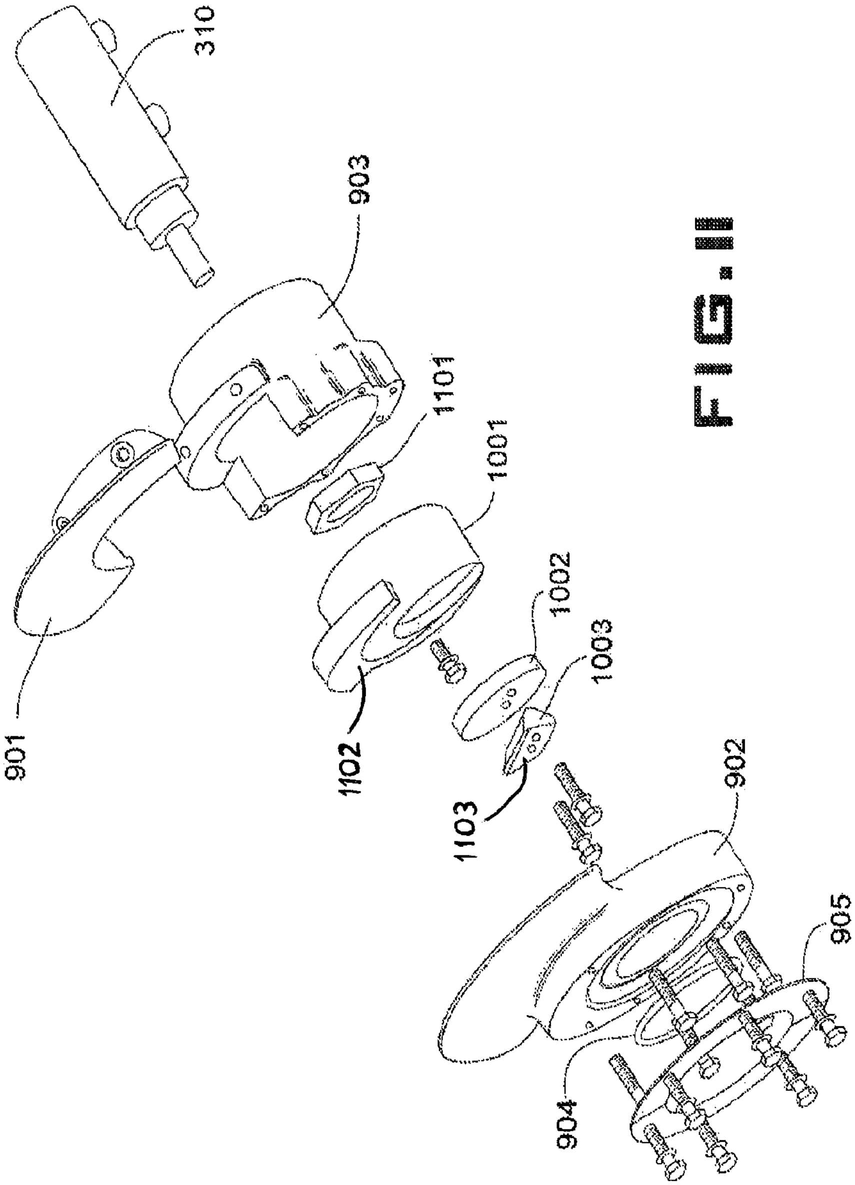
FIG. 11 is an expanded view of the spray head of FIGS. 9A and 9B.

Notably, spray head 200 depicted in FIGS. 9-11 does not include one or more o-ring seals between piston 1001 and spray head body 903. It was discovered that the absence of such o-ring seals permitted some fluid to flow behind piston 1001 and into chamber 307. The presence of fluid in chamber 307 was found to be advantageous because it allows for greater control over the rate at which piston 1001 is raised and lowered, thereby permitting greater control over the fluid rate and pressure as fluid exits outlet passage 304. This is, in part, how spring 328 may be compressed at a constant rate as opposed to forcing piston 1001 into being in the open or closed position. This blow-by gap between piston 1001 and spray head body 903 around the circumference of the piston is at least about 0.25 mm, such as at least about 0.5 mm or at least about 0.75 mm. In one example, the blow-by gap between piston 1001 and spray head body 903 is between about 0.75 mm and about 1.5 mm, such as about 1.0 mm. One advantage of the blow-by gap is that fluid is not trapped in chamber 307. Rather, the fluid drains out of chamber 307, thereby reducing the likelihood of corrosion or freezing damage. Moreover, unexpectedly, the changes to the design of spray head 200 originating from the absence of an o-ring lead to an increased spray width, at some pressures by as much as at least about 8 ft. Whereas the previous maximum spray width was between about 20 ft to about 30 ft, the maximum spray width attainable with spray head 200 is between about 30 ft and about 40 ft.

FIG. 11 shows spray head 200 assembly in an exploded view, depicting how hydraulic cylinder 310 is connected to spray head body 903 with nut 1101. Further, FIG. 11 shows the portion of piston 1001 referred to as dam 1102, which acts as an initial fluid deflector that reduces aeration of the fluid and helps yield a flatter fluid spray dispersion.

Spray head 200 configuration advantageously allows for constant fluid delivery pattern at an adjustable delivery rate.

INDUSTRIAL APPLICABILITY

An example of application of the present disclosure can be described with reference to the flow diagrams of FIGS. 6 and 7.

Figure 6:
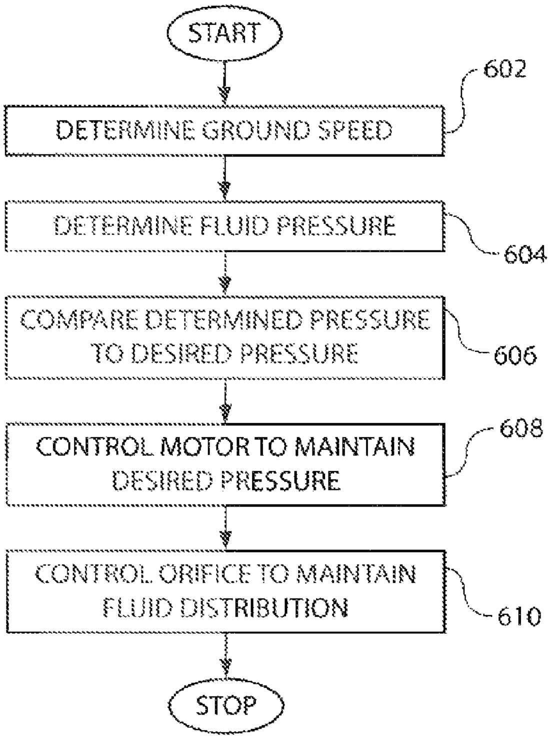
FIG. 6 is a flow diagram depicting a method of the present disclosure.

Referring to FIG. 6, in a first control block 602, a ground speed of the mobile machine 102 is determined. The ground speed may be sensed directly, for example by a ground speed sensor 414, or may be determined by other means known in the art.

In a second control block 604, a fluid pressure of the fluid lines 432 is determined. The fluid pressure may be sensed directly, for example by a fluid pressure sensor 416, or may be determined by other means known in the art. The fluid pressure may be determined from the fluid lines 432 directly, or may be determined at some other location associated with the fluid lines 432, such as the spray head 200, the fluid pump 426, the pump 410, the motor 412, or some other location. The fluid pressure may also be determined at multiple locations.

In a third control block 606, the determined fluid pressure is compared to a desired fluid pressure. The desired fluid pressure may be set based on a pre-programmed spray mode, a manually input desired fluid pressure, by some other operating mode of the fluid distribution system 100, or by some other determined or input parameter.

In a fourth control block 608, the motor 412 is controlled to maintain the determined fluid pressure at the desired fluid pressure. The motor 412 may be a variable displacement motor 412, which may be controlled by varying the displacement of the motor 412, as is well known in the art. Alternatively, the pump 410 may be a variable displacement pump 410 that may be controlled for the same purpose. Other types of controllable pumps and motors, such as electric and such, may also be used to control the fluid pressure. As an alternative to controllable pumps and/or motors, other means known in the art, such as variable orifices, valves, and the like, may be used to maintain the fluid pressure as well. In yet another configuration, the motor 412 is a variable displacement motor and the pump 410 is variable displacement pump. Such a configuration allows for a wide range of fluid pressure through the spray head 200, such as below about 10 psi to more than about 110 psi, although fluid pressure is more typically within the range of between about 50 psi to about 80 psi at idle.

In a fifth control block 610, each variable orifice 308 is controlled to maintain a desired distribution of fluid. In a fluid distribution system 100 having multiple spray heads 200, and thus a corresponding multiple of orifices 308, each variable orifice 308 may be controlled independent of each other variable orifice 308, and all orifices 308 may be controlled independent of fluid pressure. The variable orifices 308 may be controlled to maintain a desired fluid distribution, for example a desired fluid distribution per unit of area. Control of the variable orifices 308 may be accomplished by controllably opening and closing each orifice in a manner described above with reference to FIG. 3. Opening and closing an orifice 308 is a variable process, thus providing a continuously variable number of orifice positions for optimal control of the distribution of fluid.

Figure 7:
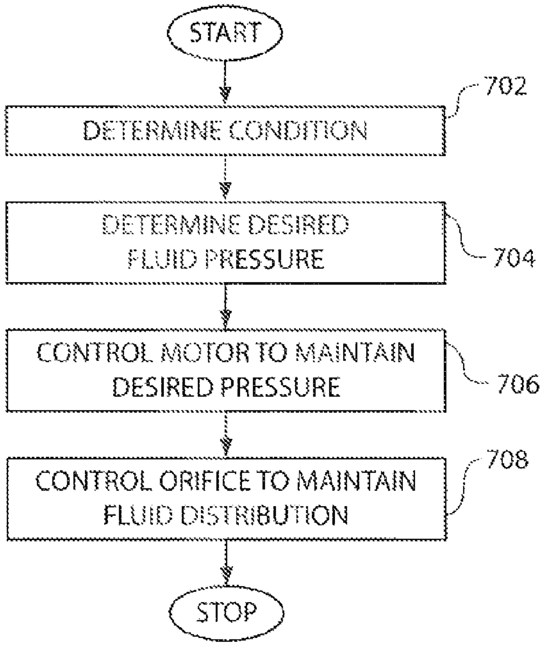
FIG. 7 is a flow diagram depicting another method of the present disclosure.

Referring to FIG. 7, a flow chart depicting another method of the present disclosure is shown.

In a first control block 702, a condition associated with a location for fluid distribution is determined. Although a number of conditions may be determined, for illustrative purposes an exemplary condition of a level of dryness associated with the location is described. The level of dryness may be determined, for example in a water truck application, by an operator's observations of a relative dryness of the roads and surfaces to be sprayed. Alternatively, other more automated means for determining a level of dryness may be used.

In a second control block 704, a desired fluid pressure as a function of the determined condition is determined. The desired fluid pressure may be a modification of the desired fluid pressure associated with the method described with reference to FIG. 6.

In a third control block 706, the motor 412 is controlled to maintain the desired fluid pressure, in the same manner as described above with reference to FIG. 6.

In a fourth control block 708, the variable orifice 308 is controlled as a function of both the ground speed and the determined condition to maintain the desired distribution of fluid.

The present disclosure provides a mobile fluid distribution system 100 and method which offers many advantages, among which includes providing control of fluid distribution over a desired area, in particular control of an amount of fluid distributed over a desired unit of area under varying conditions. Maintaining a constant fluid pressure while varying the flow rate through individual spray heads 200 provides more precise control of fluid distribution and the capability for a number of specialized flow control modes.

Other aspects can be obtained from a study of the drawings, the specification, and the appended claims.

What is claimed is:

1. A spray head for a fluid distribution system comprising:
- a fluid inlet passage;
- a fluid outlet passage;
- a piston disposed in a chamber of a spray head body for controlled access between the inlet and outlet passages and defining a variable orifice;
- an internal diverter joined to the piston and disposed within the variable orifice, the internal diverter having a wedge shape projecting outwardly from a base adjacent the piston to an internal diverter surface spaced upstream of the piston and facing the inlet passage, a ratio of an area of the internal diverter surface and an area of the inlet passage is between about 2:3 and about 1:10, wherein the internal diverter is disposed in the inlet passage when the variable orifice is closed; and a double acting hydraulic cylinder controllably engaged to the orifice.

2. The spray head of claim 1, wherein the piston is oriented within the chamber such that there is a blow-by gap between the piston and the spray head body around the circumference of the piston of at least about 0.25 mm.

3. The spray head of claim 1, wherein the piston is oriented within the chamber such that there is a blow-by gap between the piston and the spray head body around the circumference of the piston of between about 0.75 mm and about 1.5 mm.

4. The spray head of claim 1, wherein the ratio of the area of said internal diverter surface to the area of the inlet passage is between about 1:3 and about 1:4.

5. The spray head of claim 1, the spray head further including a fluid deflector connected to the spray head and configured to control a fluid distribution pattern from the outlet passage.

6. The spray head of claim 5, wherein the fluid deflector is configured to control a fluid distribution pattern in a laminar flow from the outlet passage.

7. The spray head of claim 6, the spray head further including a second fluid deflector.

8. The spray head of claim 1, wherein the hydraulic cylinder includes:

a hydraulic piston having a head end and a rod end;

a rod connecting the hydraulic piston to the fluid piston;

a first hydraulic port positioned to allow hydraulic fluid in the hydraulic cylinder at the rod end; and a second hydraulic port positioned to allow hydraulic fluid in the hydraulic cylinder at the head end.

9. The spray head of claim 8, wherein the hydraulic cylinder further includes a spring disposed in the hydraulic cylinder at the head end.

10. The spray head of claim 1, wherein the hydraulic cylinder is fluidly isolated from the chamber.

11. A fluid distribution system, comprising:

a power source;

a pump driven by the power source;

a motor driven by the pump; and a spray head configured to receive fluid from a fluid source associated with the motor, the spray head including;

a fluid inlet passage;

a fluid outlet passage;

a piston disposed in a chamber of a spray head body for controlled access between the inlet and outlet passages and defining a variable orifice;

an internal diverter joined to the piston and disposed within the variable orifice, the internal diverter having a wedge shape projecting outwardly from a base adjacent the piston to an internal diverter surface spaced upstream of the piston and facing the inlet passage, a ratio of an area of the internal diverter surface and an area of the inlet passage is between about 2:3 and about 1:10, wherein the internal diverter is disposed in the inlet passage when the variable orifice is closed; and a double acting hydraulic cylinder controllably engaged to the orifice.

12. The fluid distribution system of claim 11, wherein the motor is a variable displacement motor.

13. The fluid distribution system of claim 12 further comprising:

a ground speed sensor;

a fluid pressure sensor; and a controller receivably connected to the ground speed sensor and the fluid pressure sensor, and controllably connected to the variable displacement motor and the spray head.

14. The fluid distribution system of claim 13, wherein the spray head includes a plurality of independently controllable spray heads.

15. The fluid distribution system of claim 11, wherein the variable orifice is a continuously variable orifice.

16. The fluid distribution system of claim 11, wherein the power source includes a prime mover for a mobile machine.

17. The fluid distribution system of claim 16, wherein the prime mover includes an engine drivingly connected to the mobile machine and a transmission driven by the engine.

18. The fluid distribution system of claim 17, wherein the pump is a hydraulic pump driven by one of the engine and the transmission.

19. A spray head for a fluid distribution system comprising:

a fluid inlet passage;

a fluid outlet passage;

a piston disposed in a chamber of a spray head body for controlled access between the inlet and outlet passages and defining a variable orifice, wherein the piston is oriented within the chamber such that there is a blow-by gap between the piston and the spray head body around the circumference of the piston of at least about 0.25 mm;

an internal diverter joined to the piston and disposed within the variable orifice, the internal diverter having a wedge shape projecting outwardly from a base adjacent the piston to an internal diverter surface spaced upstream of the piston and facing the inlet passage, wherein the internal diverter is disposed in the inlet passage when the variable orifice is closed, and wherein the internal diverter surface faces the inlet passage and a ratio of the area of said internal diverter surface to the area of the inlet passage is between about 2:3 and about 1:10; and a double acting hydraulic cylinder controllably engaged to the orifice.

* * * * *